United States Patent
Chen et al.

(10) Patent No.: US 10,432,991 B2
(45) Date of Patent: Oct. 1, 2019

(54) SECURE SESSION-BASED VIDEO WATERMARKING FOR ONLINE MEDIA STREAMING

(71) Applicant: GOOGLE LLC, Mountain View, CA (US)

(72) Inventors: Haoming Chen, Kirkland, WA (US); Thomas Inskip, Seattle, WA (US); Kongqun Yang, Kirkland, WA (US)

(73) Assignee: GOOGLE LLC, Mountain View, CA (US)

( * ) Notice: Subject to any disclaimer, the term of this patent is extended or adjusted under 35 U.S.C. 154(b) by 20 days.

(21) Appl. No.: 15/788,770

(22) Filed: Oct. 19, 2017

(65) Prior Publication Data

US 2019/0124377 A1    Apr. 25, 2019

(51) Int. Cl.
| | | |
|---|---|---|
| *H04N 21/2389* | (2011.01) | |
| *H04N 19/467* | (2014.01) | |
| *G06F 16/48* | (2019.01) | |
| *H04N 21/8358* | (2011.01) | |
| *H04N 21/222* | (2011.01) | |

(Continued)

(52) U.S. Cl.
CPC ....... *H04N 21/23892* (2013.01); *G06F 16/48* (2019.01); *H04N 19/467* (2014.11); *H04N 21/222* (2013.01); *H04N 21/2351* (2013.01); *H04N 21/8358* (2013.01); *H04N 21/8456* (2013.01); *H04N 21/85406* (2013.01); *G06F 21/10* (2013.01); *G06F 21/16* (2013.01); *H04L 9/08* (2013.01); *H04L 9/16* (2013.01);

(Continued)

(58) Field of Classification Search
CPC . H04L 9/0861; H04L 9/3242; H04L 63/0435; H04L 63/045; H04L 63/0428; H04L 9/3247; H04L 9/08; H04L 9/16; H04N 21/254; H04N 21/23892; H04N 21/8358; G06F 21/16; G06F 21/10
USPC .................. 713/190, 176, 168, 151; 725/31; 380/201

See application file for complete search history.

(56) References Cited

U.S. PATENT DOCUMENTS

| | | |
|---|---|---|
| 7,058,809 B2 | 6/2006 | White et al. |
| 7,197,164 B2 | 3/2007 | Levy et al. |

(Continued)

OTHER PUBLICATIONS

Kun He, Patrick Maillé, Gwendal Simon Delivery of LiveWatermarked Video in CDN: Fast and Scalable Algorithms NOSSDAV'17, Jun. 20-23, 2017, Taipei, Taiwan pp. 6 (Year: 2017).*

(Continued)

*Primary Examiner* — Wasika Nipa
*Assistant Examiner* — Ali H. Cheema
(74) *Attorney, Agent, or Firm* — Brake Hughes Bellermann LLP (57) ABSTRACT

A method includes generating a first media file that includes a plurality of first media file segments, generating a second media file as a copy of the first media file, the second media file includes a plurality of second media file segments, embedding a first watermark with the plurality of first media file segments, embedding at least one second watermark with the plurality of second media file segments, generating a manifest file based on a portion of the plurality of first media file segments and a portion of the plurality of second media file segments, the manifest file including a plurality of addresses each referencing a media file segment, and encrypting each of plurality of addresses.

20 Claims, 9 Drawing Sheets

(51) Int. Cl.
*H04N 21/235* (2011.01)
*H04N 21/845* (2011.01)
*H04N 21/854* (2011.01)
*G06F 21/16* (2013.01)
*H04L 9/16* (2006.01)
*H04L 9/08* (2006.01)
*H04N 21/234* (2011.01)
*G06F 21/10* (2013.01)
*H04L 9/32* (2006.01)

(52) U.S. Cl.
CPC ...... *H04L 9/3247* (2013.01); *H04N 21/23424* (2013.01); *H04N 21/23895* (2013.01)

(56) References Cited

U.S. PATENT DOCUMENTS

| | | | |
|---|---|---|---|
| 7,409,556 B2 | 8/2008 | Wu et al. | |
| 7,558,704 B2 | 7/2009 | Kanai et al. | |
| 9,426,502 B2 | 8/2016 | Perry et al. | |
| 10,241,720 B2* | 3/2019 | Jarnikov | G06F 3/0655 |
| 2004/0133908 A1* | 7/2004 | Smith | H04L 63/045 |
| | | | 725/31 |
| 2005/0169497 A1 | 8/2005 | Gustafson et al. | |
| 2005/0193205 A1* | 9/2005 | Jacobs | G06F 21/10 |
| | | | 713/176 |
| 2011/0158465 A1 | 6/2011 | Zou et al. | |
| 2011/0194026 A1 | 8/2011 | Reme | |
| 2011/0231660 A1* | 9/2011 | Kanungo | H04L 63/0435 |
| | | | 713/168 |
| 2013/0042100 A1* | 2/2013 | Bouazizi | H04N 21/254 |
| | | | 713/151 |
| 2013/0311780 A1* | 11/2013 | Besehanic | H04L 9/3247 |
| | | | 713/176 |
| 2015/0356281 A1* | 12/2015 | Van Deventer | H04L 9/008 |
| | | | 713/176 |
| 2016/0050074 A1* | 2/2016 | Romrell | H04N 21/8358 |
| | | | 713/176 |
| 2016/0171186 A1* | 6/2016 | Marking | H04L 9/0861 |
| | | | 713/190 |
| 2016/0315766 A1* | 10/2016 | Ujiie | H04L 63/0428 |
| 2017/0118537 A1* | 4/2017 | Stransky-Heilkron | |
| | | | G06F 21/16 |
| 2019/0098344 A1* | 3/2019 | Shanson | H04N 21/23424 |

OTHER PUBLICATIONS

"Information technology—Dynamic adaptive streaming over HTTP (DASH)—Part 1: Media presentation description and segment formats", International Standard; ISO/IEC 23009-1, Second Edition, May 15, 2014, 152 pages.
Pantos, R. , "HTTP Live Streaming", Informational Internet Draft; Apple Inc., May 22, 2017, 58 pages.
"Use Cases on DASH Authentication", Intel, 3GPP TSG-SA4 MBS Ad-Hoc #24, S4-AHI399, retrieved from: http://www.3gpp.org/ftp/tsg_sa/WG4_CODED/Ad-hoc_MBS/Docs_AHI/, retrieved on May 31, 2013, 7 pages, XP050710147.
Giladi, A., "Integrating Forensic Watermarking Into Adaptive Streaming Workflow", International Broadcasting Conference 2017, Sep. 14-18, 2017, 11 pages, XP030082672.
Giladi, Alex et al., "Using segment templates for forensic watermarking", Comcast, MPEG Meeting, Jul. 17-21, 2017, No. m41173, 4 pages, XP030069516.
International Search Report and Written Opinion for International Application No. PCT/US2018/056474, dated Jan. 21, 2019, 17 pages.
Jarnikov, Dmitri et al., "A Watermarking System for Adaptive Streaming", White Paper Revenue Assurance, Feb. 28, 2014, 12 pages, XP055218374.
Ran, Dubin et al., "Novel Ad Insertion Technique for MPEG-DASH", 2015 12th Annual IEEE Consumer Communications and Networking Conference, IEEE, Jan. 9, 2015, pp. 582-587. XP033176192.
Thomas, Emmanuel et al., "Proposed integration of URI signing in MPEG-DASH use cases", TNO, MPEG Meeting, Jul. 7-11, 2014, No. m34260, 6 pages, XP030062633.
Van Brandenburg, Ray, "URI Signing for HTTP Adaptive Streaming (HAS)", Jun. 6, 2016, 21 pages, XP015113370.

* cited by examiner

SECURE SESSION-BASED VIDEO WATERMARKING FOR ONLINE MEDIA STREAMING

FIELD

Embodiments relate to watermarking of online media streaming

BACKGROUND

With the emergence of premium or high value (e.g., Ultra High Definition (UHD)/4K and High Dynamic Range (HDR)) video, additional protections for the content are typically required by the content owners. Current Digital Rights Management (DRM) systems can control access to the video content. However, if piracy occurs, it is difficult to stop the illegal sharing of the pirated media. Forensic watermarking can protect the content in different ways. For example, forensic watermarking can deter the piracy by warning a user the content is uniquely watermarked. In addition, the source of piracy can be identified by analyzing the watermarked media stream and the content owner or provider can take action.

In order to make forensic watermarking work, each session should receive a uniquely watermarked copy of the media, with each watermarked copy identifying the specific streaming session or the type of device decoding the media. For an online video streaming service with hundreds of thousands users, or thousands of device types, it is almost impossible to store that many copies of the media on the server or content delivery network (CDN). Also, real-time generation of each unique video sequence is computationally intensive, and therefore does not scale well.

SUMMARY

Embodiments relate to adding watermarks to streaming video.

In a general aspect, a method includes generating a first media file that includes a plurality of first media file segments, generating a second media file as a copy of the first media file, the second media file includes a plurality of second media file segments, embedding a first watermark with the plurality of first media file segments, embedding at least one second watermark with the plurality of second media file segments, generating a manifest file based on a portion of the plurality of first media file segments and a portion of the plurality of second media file segments, the manifest file including a plurality of addresses each referencing a media file segment, and encrypting each of plurality of addresses.

In another general aspect, a device (e.g., Content Delivery Network (CDN)) includes a memory and a processor. The memory is configured to store a first media file that includes a plurality of first media file segments, a second media file as a copy of the first media file, the second media file includes a plurality of second media file segments, and a manifest file. The processor configured to embed a first watermark with the plurality of first media file segments, embed at least one second watermark with the plurality of second media file segments, generate the manifest file based on a portion of the plurality of first media file segments and a portion of the plurality of second media file segments, the manifest file including a plurality of addresses each referencing a media file segment, encrypt each of plurality of addresses, receive an encrypted address referencing one of the plurality of first media file segments or one of the plurality of second media file segments, decrypt the encrypted address, select one of the plurality of first media file segments or one of the plurality of second media file segments using the decrypted address, and communicate the one of the plurality of first media file segments or one of the plurality of second media file segments in response to receiving the encrypted address.

In yet another general aspect, a non-transitory computer readable medium includes code segments stored thereon. The code segments, when executed by a processor cause the processor to generate a first media file that includes a plurality of first media file segments, generate a second media file as a copy of the first media file, the second media file includes a plurality of second media file segments, embed a first watermark with the plurality of first media file segments, embed at least one second watermark with the plurality of second media file segments, generate a manifest file based on a portion of the plurality of first media file segments and a portion of the plurality of second media file segments, the manifest file including a plurality of addresses each referencing a media file segment, and encrypt each of plurality of addresses.

Implementations can include one or more of the following features. For example, the method or steps can further include receiving an encrypted address referencing one of the plurality of first media file segments or one of the plurality of second media file segments, decrypting the encrypted address, selecting one of the plurality of first media file segments or one of the plurality of second media file segments using the decrypted address, and communicating the one of the plurality of first media file segments or one of the plurality of second media file segments in response to receiving the encrypted address. The manifest file can be further based on a repeating watermark sequence. The address can be a Uniform Resource Locator (URL). Encrypting each of plurality of addresses can include using an Advanced Encryption Standard (AES) with a shared per-session encryption key. Encrypting each of plurality of addresses can include using a shared per-session encryption key, and the shared per-session encryption key can be a session key derived from a common shared key, and session-specific data known to services using the key. Encrypting each of plurality of addresses can include using a shared per-session encryption key, and the shared per-session key can be encrypted with a common shared key. The plurality of addresses can be a URL used to locate and retrieve an associated media file segment from a memory of a Content Delivery Network (CDN).

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Example embodiments disclose a segment variant based watermarking algorithm that can generate unique watermarked videos from two or more base watermarked videos. The unique watermarked videos can be generated in a manner such that streamed video can be resistant to tampering (e.g., removing or changing a watermark).

An implementation can use variant watermarking (described in detail below). In variant watermarking, instead of using a single unique watermark over the entire media stream, media segments can be watermarked using different watermarks. The combination and sequence of watermarks in each segment can be used to generate a distinctive watermark for the streaming video. Each media segment can be referenced using an encrypted address in order to prevent piracy of the corresponding video stream. The encrypted addresses can be listed in a manifest file used in streaming the media.

Figure 1:
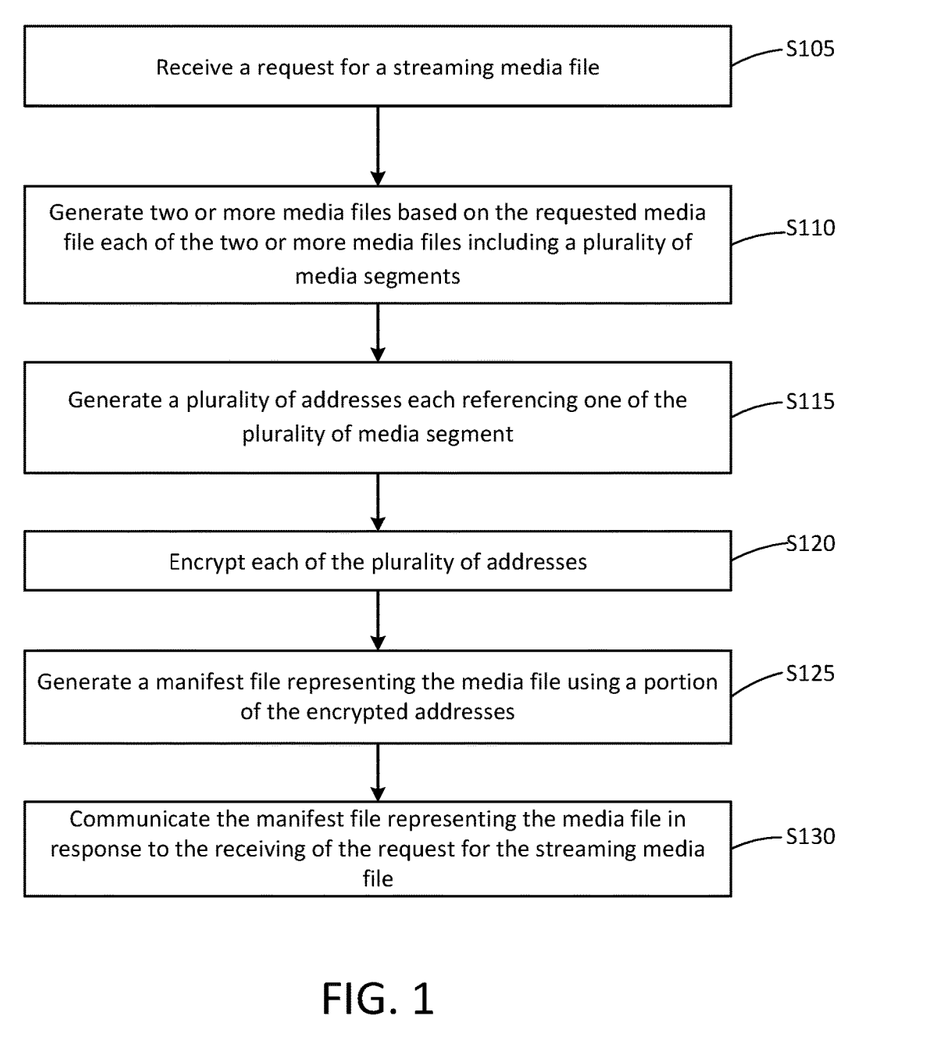
FIG. 1 illustrates a flowchart of a method for generating a manifest file according to at least one example embodiment.

FIG. 1 illustrates a flowchart of a method for generating a manifest file according to at least one example embodiment. As shown in FIG. 1, in step S105 a request for a streaming media file is received. For example, a user or subscriber of a streaming video service can use an application (e.g., software) to request a video. The application can include a video selection mechanism. For example, a drop-down list or menu, a movie illustration and the like can be clicked on by a user of the application to select the video. The video can have a unique identifier associated with the video service. This unique identifier for the video can be received in the request for the streaming media file in order to identify the video to the streaming video service.

In step S110 two or more media files are generated based on the requested media file. Each of the two or more media files includes a plurality of media segments. For example, two copies of one media file can be generated. In other words, a video file can have two physical files stored in association with the video streaming service. Each of the two files can be partitioned or divided into a plurality of media segments. The media segments can be, for example, time based (e.g., by seconds) portions of the video file.

In step S115 a plurality of addresses are generated. Each address references one of the plurality of media segments. For example, a Uniform Resource Locator (URL) address can be assigned to each of the plurality of media segments. In other words each of the plurality of media segments can be located using a URL.

In step S120 each of the plurality of addresses are encrypted. For example, a shared per-session encryption key can be established and be available to all streaming services using the key. For example, the shared per-session encryption key can be available to a Content Delivery Network (CDN) component(s) used to generate and deliver media manifest files and the media segments. In an example implementation, an Advanced Encryption Standard (AES) can be used to encrypt the plurality of addresses where the length of the shared per-session encryption key (e.g., 128-bit, 192-bit, 256-bit and the like) is selected based on a desired security level. For example, the length of the shared per-session encryption key can be selected based on the number of segments in the repeating watermark sequence 315 (described below).

Each of the plurality of addresses is then encrypted using the shared per-session encryption key. The shared per-session encryption key can be a key management system which propagates the key to all the services requesting the key. The shared per-session encryption key can be a session key derived from a common shared key, and some session-specific data which is known to all services using the key. The shared per-session encryption key can be a shared per-session key encrypted with a common (e.g., assigned to the CDN, assigned to the streaming video service, and the like) shared key. The shared per-session key can be stored in shared data (e.g., the media manifest file). In some media streaming implementations, the content, media and/or media segments can be encrypted using a key or per-session key. The same key or per-session key can be used to encrypt each URL. However, a different key can be used as well. Further, encrypting the content, media and/or media segments is performed separate from encrypting each URL.

In step S125 a manifest file representing the media file is generated using a portion of the encrypted addresses. For example, a manifest file includes URLs and used to retrieve media segments individually. In other words, the manifest file can include a sequence of individual URLs used by a media player to individually request the media segments representing the streaming media file. According to example embodiments, the URLs are encrypted using the shared per-session key. Therefore, the manifest will contain a sequence of individually encrypted URLs rather than plain-text URLs.

In step S130 the manifest file representing the media file is communicated in response to the receiving of the request for the streaming media file. For example, the streaming service (e.g., CDN) can communicate the manifest file to the media player (e.g., that requested the video) in response to the request for the streaming media file.

Figure 2:
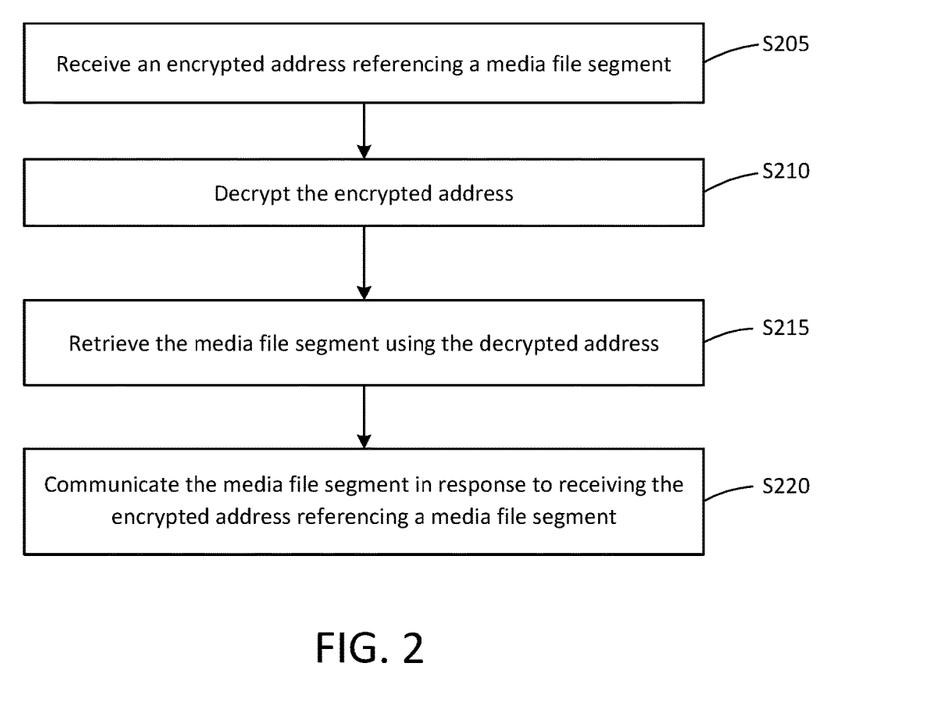
FIG. 2 illustrates a flowchart of a method for communicating a media file segment according to at least one example embodiment.

FIG. 2 illustrates a flowchart of a method for communicating a media file segment according to at least one example embodiment. As shown in FIG. 2, in step S205 an encrypted address referencing a media file segment is received. For example, the streaming service (e.g., CDN) can receive a URL communicated from a media player via a Hypertext Transfer Protocol (HTTP). The media file segment can be one segment of a plurality of media segments. The plurality of media segments can be associated with a streaming media session. The streaming media session can use encrypted addresses for referencing the plurality of media segments. The encrypted addresses can be URLs referencing media file segments.

In step S210 the encrypted address is decrypted. For example, the shared per-session encryption key (discussed above) can be retrieved from within the CDN component(s) used to generate and deliver media manifest files and the media segments. The address is then decrypted using the shared per-session encryption key. The address can be decrypted using an inverse technique related to the technique used to encrypt the address as described above.

In step S215 the media file segment is retrieved using the decrypted address. For example, the media file segment can be retrieved from a memory associated with the CDN. The decrypted address can be a URL used to locate and retrieve the media file segment from a memory associated with the CDN.

In step S220 the media file segment is communicated in response to receiving the encrypted address referencing a media file segment. For example, the streaming service (e.g., CDN) can communicate the media file segment to the media player (e.g., that requested the video) in response to receiving the encrypted address. The media file segment can be communicated using the same protocol (e.g., HTTP) as the encrypted address was received. Further, prior to communicating the file segment, the file segment can be encoded using, for example, MPEG, H.265, H.264, VP9, and the like coding formats.

Figure 6:
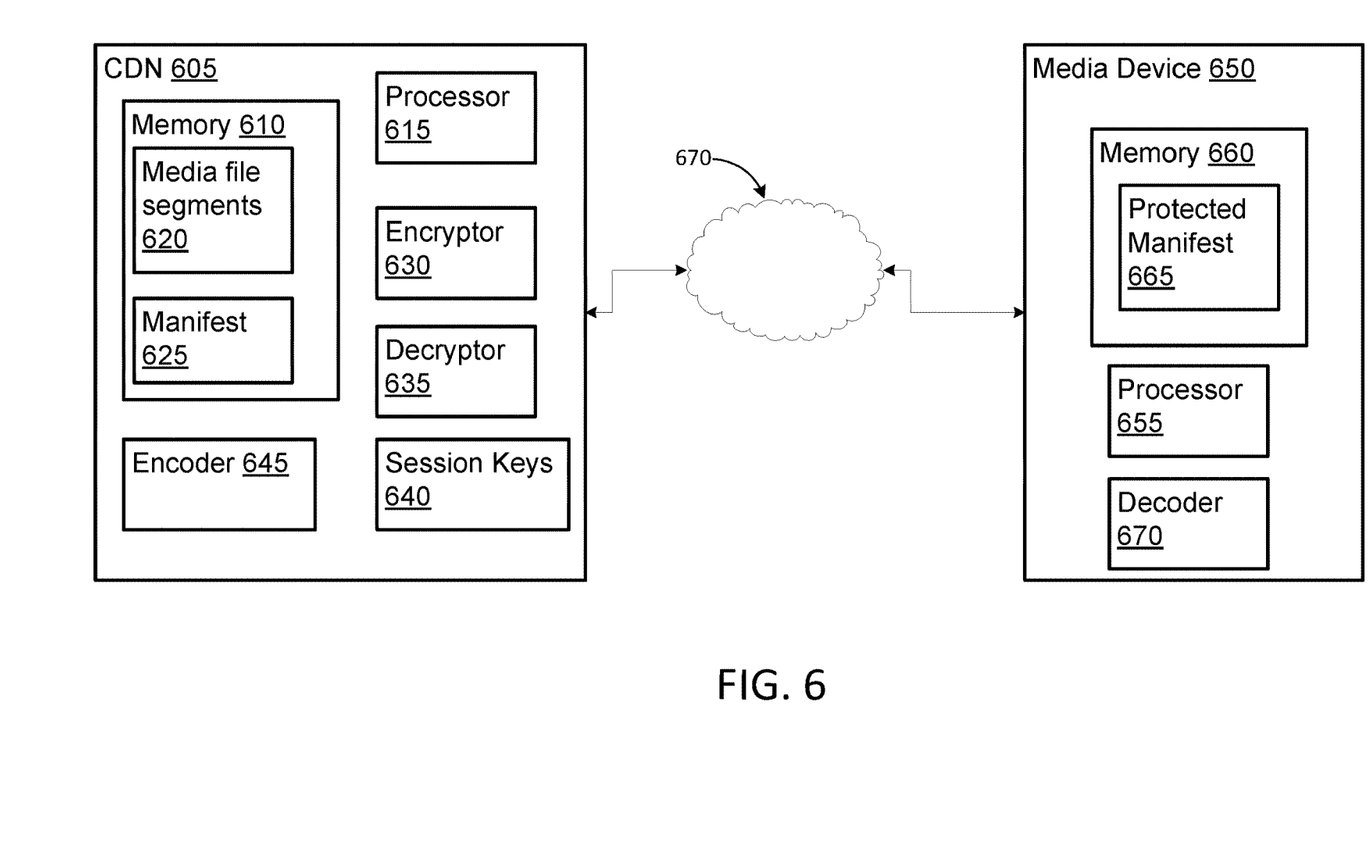
FIG. 6 illustrates a block diagram of a streaming media system according to at least one example embodiment.

The steps described above with regard to FIGS. 1 and 2 may be performed due to the execution of software code stored in a memory (e.g., memory 610 and 660) associated with an apparatus (e.g., as shown in FIGS. 6, 7, and/or 8) and executed by at least one processor (e.g., processor 615 and 655) associated with the apparatus. In an example implementation, a non-transitory computer-readable storage medium can have computer executable program code stored thereon. The computer executable program code can causes a computer system to perform steps associated the methods described with regard to FIGS. 1 and 2. However, alternative embodiments are contemplated such as a system embodied as a special purpose processor. Although the steps described above are described as being executed by a processor, the steps are not necessarily executed by a same processor. In other words, at least one processor may execute the steps described above with regard to FIGS. 1 and 2.

Figure 3:
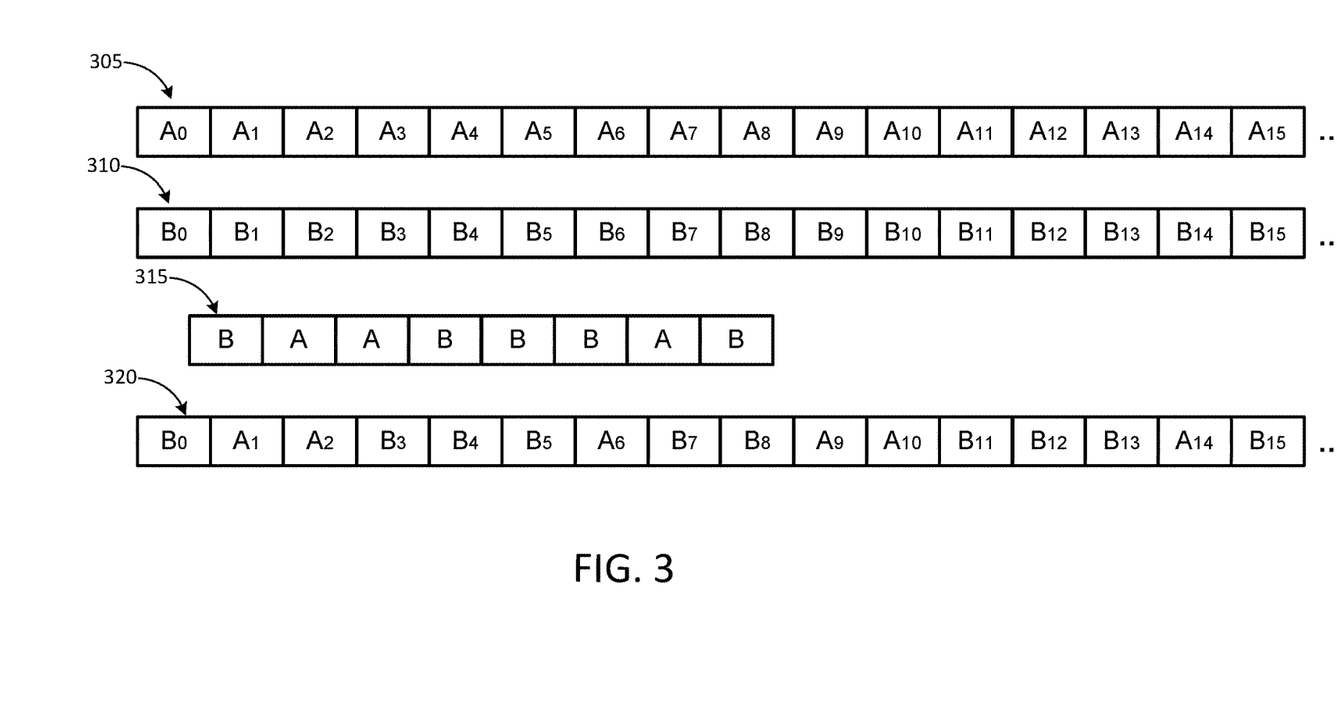
FIG. 3 illustrates a block diagram of a segment variant based watermarking algorithm according to at least one example embodiment.

FIG. 3 illustrates block diagrams of a segment variant based watermarking algorithm according to at least one example embodiment. As shown in FIG. 3 a first stream 305 includes a plurality of media segments $A_0$ to $A_{15}$ (and beyond) and a second stream 310 includes a plurality of media segments $B_0$ to $B_{15}$ (and beyond). The stream 305 can be marked with a first 'A' watermark and the stream 310 can be marked with a second 'B' watermark.

Watermarking can include embedding the watermark in the media content (e.g., in the video, in the media file and/or media file segment), detecting that a watermark exists and reading the embedded watermark. The embedding can include altering data samples of the media content. The reading can extract watermark information from a detected watermark. For example, watermarks can be encoded into and decoded from video frames, sequences, tracks and the like for the purpose of conveying information related to the streaming video. A watermark encoding process can embeds a watermark into a video signal, or in some cases, the physical object that later becomes a video object through video capture. At play-back, a decoding process extracts the watermark. The watermark can be presented during playback in order to indicate ownership of the streaming video. Other purposes (e.g., to generate a user interface or communicate and show subtitles and the like) are within the scope of this disclosure.

In an example embodiment, a streaming media file (e.g., streaming video) can based on at least two streams (e.g., stream 305 and stream 310) with a repeating watermark sequence. For example, the repeating watermark sequence 315 can be used to generate a variant stream 320. Where the variant stream 320 includes media segments selected from both stream 305 and stream 310 based on the repeating watermark sequence 315.

As shown in FIG. 3, the repeating watermark sequence 315 has a watermark sequence B-A-A-B-B-B-A-B which repeats periodically. Further, the variant stream 320 includes a repeating watermark sequence, $B_0$-$A_1$-$A_2$-$B_3$-$B_4$-$B_5$-$A_6$-$B_7$-$B_8$-$A_9$-$A_{10}$-$B_{11}$-$B_{12}$-$B_{13}$-$A_{14}$-$B_{15}$ . . . based on the selection of media segments selected from both stream 305 and stream 310. The watermark sequence 315 can also be used to identify a session or a device type. In other words, the watermark sequence can be a unique sequence selected based on the session or the device type (e.g., media player). Although two streams are shown, example implementations are not limited thereto. For example, an implementation could also include additional streams marked with a 'C' watermark and with a 'D' watermark.

Figure 4:
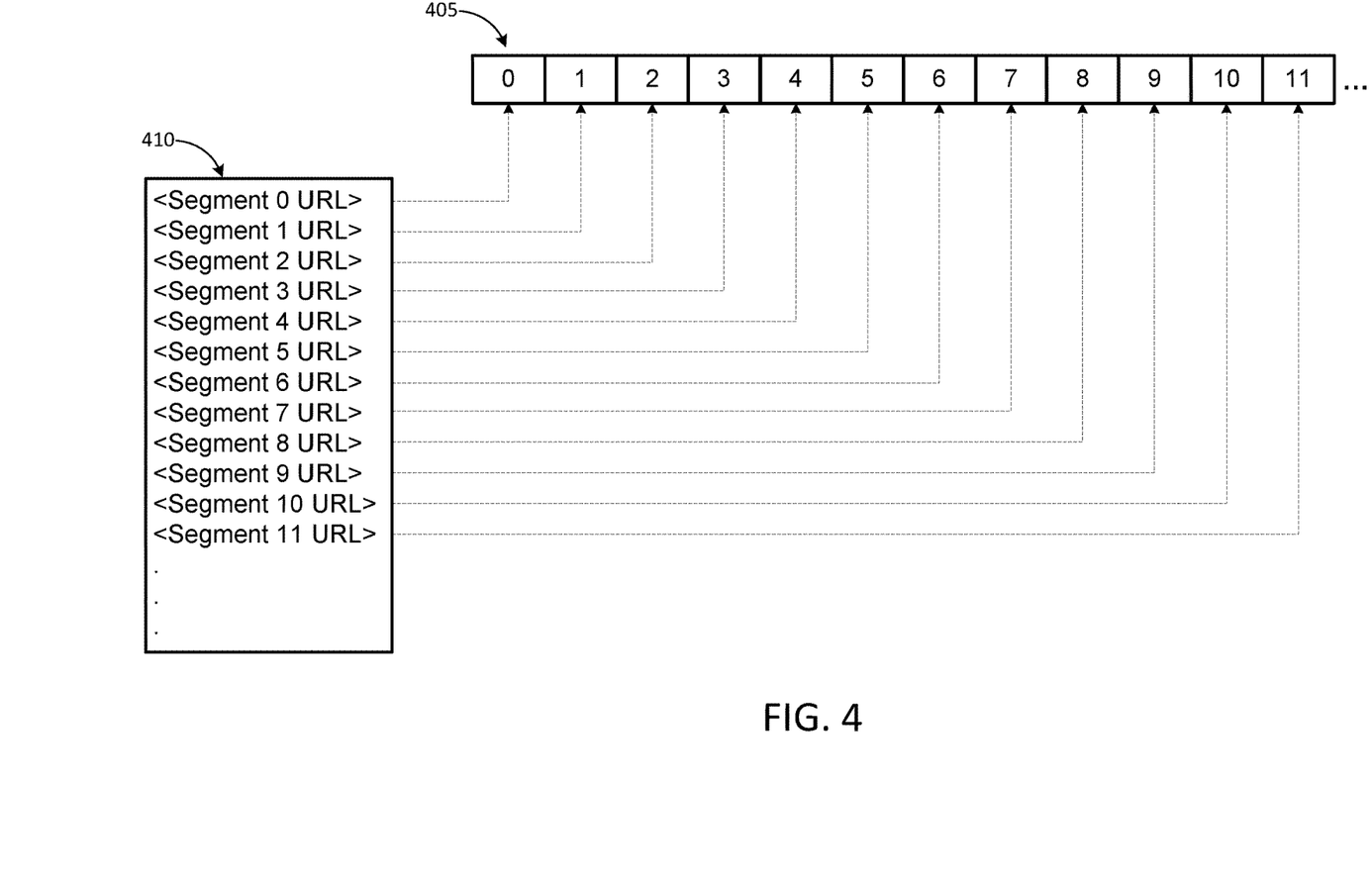
FIG. 4 illustrates a manifest file of a segment variant based watermarking algorithm according to at least one example embodiment.

FIG. 4 illustrates a manifest file of a segment variant based watermarking algorithm according to at least one example embodiment. As shown in FIG. 4 a stream 405 includes a plurality of media segments 0 to 11 (and beyond). Further, a manifest file 410 includes a plurality of addresses (e.g., URLs). For example, each address references one of the plurality of media segments. For example, a URL address Segment 0 URL can be assigned to media segment 0, a URL address Segment 1 URL can be assigned to media segment 1 and so forth. Each of the plurality of addresses can be encrypted as described above. A media player can retrieve the manifest file 410, and download each of the referenced media segments (or segment files) which make up the media stream.

Figure 5:
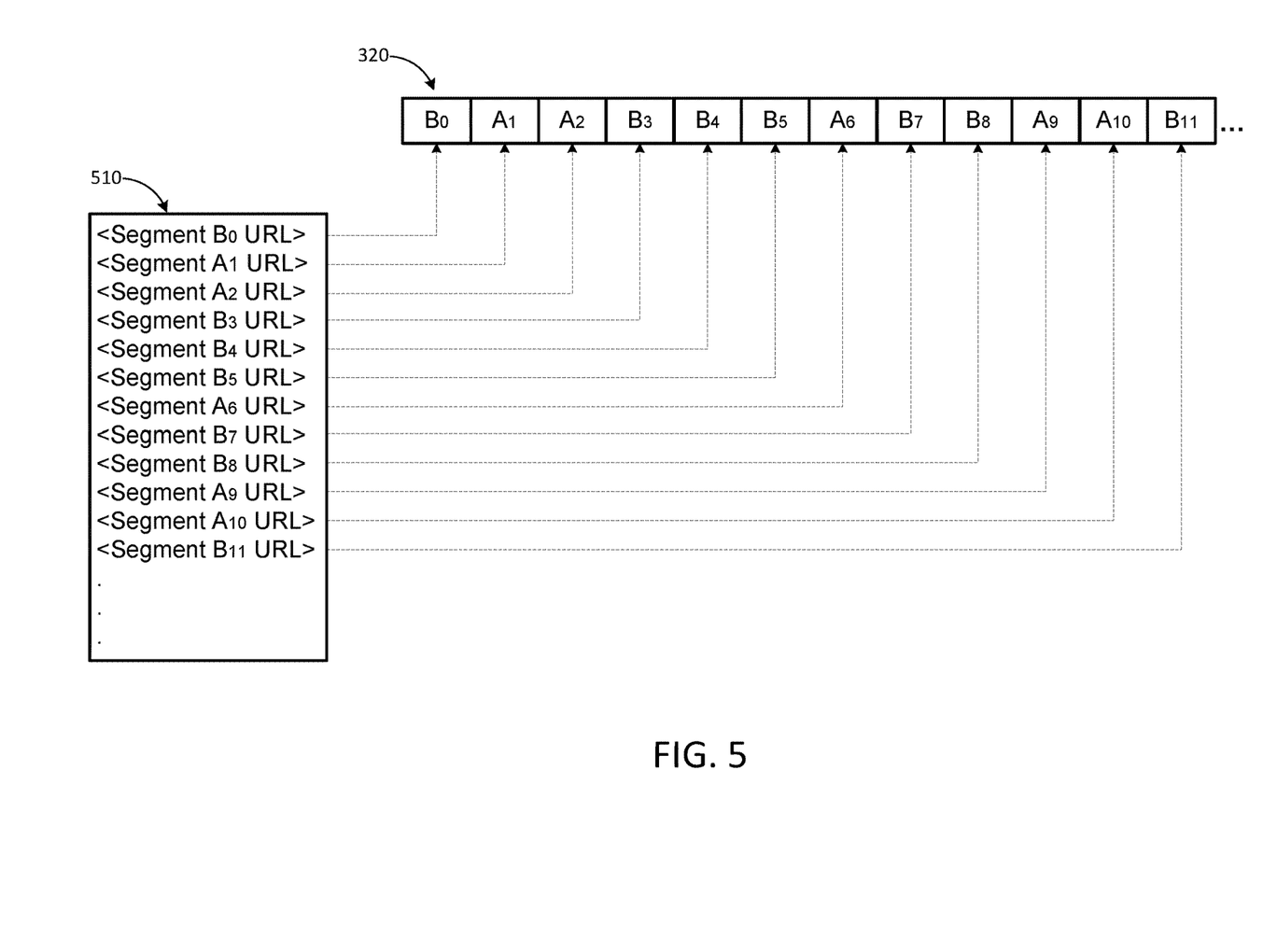
FIG. 5 illustrates another manifest file of a segment variant based watermarking algorithm according to at least one example embodiment.

FIG. 5 illustrates another manifest file of a segment variant based watermarking algorithm according to at least one example embodiment. As discussed above, the variant stream 320 includes a repeating watermark sequence, $B_0$-$A_1$-$A_2$-$B_3$-$B_4$-$B_5$-$A_6$-$B_7$-$B_8$-$A_9$-$A_{10}$-$B_{11}$-$B_{12}$-$B_{13}$-$A_{14}$-$B_{15}$ . . . based on the selection of media segments selected from both stream 305 and stream 310. As shown in FIG. 5, a manifest file 510 includes a plurality of addresses (e.g., URLs). For example, each address references one of the plurality of media segments. For example, a URL address Segment $B_0$ URL can be assigned to media segment $B_0$, a URL address Segment $A_1$ URL can be assigned to media segment $A_1$ and so forth. In this example implementation, the URLs reference different media files with different watermarks. Each of the plurality of addresses can be encrypted as described above. A media player can retrieve the manifest file 410, and download each of the referenced media segments (or segment files) which make up the media stream.

FIG. 6 illustrates a block diagram of a streaming media system according to at least one example embodiment. As shown in FIG. 6, a Content Delivery Network (CDN) 605 is communicatively coupled to a media device 650 via a network 670. The network 670 (illustrated as a cloud network) can be an Internet network, an Intranet network or the like using a communication protocol (e.g., HTTP) to enable communications between the CDN 605 and the media device 650. The CDN 605 can be configured to provide a streaming service based on the techniques described herein. The streaming service can use HTTP Live Streaming (HLS), Dynamic Adaptive Streaming over HTTP (DASH), and the like standards for streaming media content over the Internet delivered from servers (e.g., web servers). The media device 650 can be configured to provide a streaming service request and play streaming media content. Although not shown, the media device 650 can include at least one display, at least one speaker, and/or some other mechanism for using the content.

As shown in FIG. 6, the CDN 605 includes a memory 610, a processor 615, an encryptor 630, a decryptor 635, session keys 640 and an encoder 645. The memory 610 includes media file segments 620 and a manifest file 625. The media file segments 620 can also be media files or content that can be used to generate the media file segments 620. The manifest file 625 can be a plurality of manifest files from which manifest file 625 can be selected. The manifest file 625 can also be generated based on the media file segments 620 as needed and temporarily stored in memory 610.

The processor 615 (or at least one processor) may be utilized to execute instructions stored on the memory 610 (or at least one memory), so as to thereby implement the various features and functions described herein, or additional or alternative features and functions. The processor 615 and the memory 610 may be utilized for various other purposes. In particular, the memory 610 (e.g., a non-transitory computer readable storage medium) can represent an example of various types of memory and related hardware and software which might be used to implement any one of the modules or blocks described herein.

The memory 610 may be configured to store data and/or information associated with other blocks in the CDN (e.g., encoder 645). For example, the memory 610 may be configured to store codecs associated with encoding streaming video. For example, the at least one memory may be configured to store code or variables (e.g., bandwidth) associated with encoding streaming video. The memory 610 may be a shared resource.

The encryptor 630 can be configured to encrypt addresses in the manifest file 625. The decryptor 635 can be configured to decrypt addresses received from the media device 650. For example, a shared per-session encryption key can be selected from the session keys 640 and assigned to at least one streaming service. Each of the plurality of addresses in the manifest file 625 is then encrypted using the shared per-session encryption key.

The session keys 640 can shared per-session encryption key can be an element of a key management system which propagates the key to all the services requesting the key. The session keys 640 can be assigned can be shared amongst several users or media devices having access to a same content. The same key or per-session key can be used to encrypt each address (e.g., URL) in the manifest file 625. Further, encrypting media file segments 620 is performed separate from encrypting each address (e.g., URL) in the manifest file 625.

The media device 650 does not have access to the shared per-session encryption key. Therefore, the media device 650 can not access the plaintext addresses (URLs). As a result, an attacker is not able (does not have access to enough information to) deduce an address or URL pattern. In addition, the CDN 605 may only service encrypted address (URL) requests. Further, the addresses (URLs) are encrypted using a unique per-session key. Therefore, the encrypted addresses (URLs) may not be combined with encrypted addresses (URLs) from other sessions, and address (URL) decryption should fail on the CDN 605 when the segments of other sessions are requested.

The encoder 645 may be configured to receive a media file segment 620 and output compressed (e.g., encoded) video. The encoder 645 may convert the media file segments 620 into discrete video frames. The encoder 645 may use a codec based on MPEG, H.265, H.264, VP9, and the like coding formats. The encoder 645 can be configured to embed the watermark in the compressed video. For example, according to the MPEG4 codec standard video object layers can be compressed independently. Therefore, the video object layers can be combined before or after they are transmitted to a viewer. In addition, the watermark can be encoded into compressed video object layers by modulating DCT coefficients of intra or inter-frame macroblocks.

As shown in FIG. 6, the media device 650 includes a memory 660, a processor 655 and a decoder 670. The memory 660 includes a protected manifest file 665. The processor 655 (or at least one processor) may be utilized to execute instructions stored on the memory 660 (or at least one memory), so as to thereby implement the various features and functions described herein, or additional or alternative features and functions. The processor 655 and the memory 660 may be utilized for various other purposes. In particular, the memory 660 (e.g., a non-transitory computer readable storage medium) can represent an example of various types of memory and related hardware and software which might be used to implement any one of the modules or blocks described herein.

The memory 660 may be configured to store data and/or information associated with other blocks in the media device 650 (e.g., decoder 670). For example, the memory 660 may be configured to store codecs associated with decoding streaming video. For example, the at least one memory may be configured to store code or variables associated with decoding streaming video. The at memory 660 may be a shared resource.

The decoder 670 may be configured to receive an encoded media file segment 620 and output a video stream or encoded media file segment 620. The decoder 670 may convert discrete video frames of the encoded media file segment 620 into a video stream. The decoder 670 may use a codec based on MPEG, H.265, H.264, VP9, and the like coding formats. According to the MPEG4 codec standard, at the time of viewing, an MPEG4 decoder can decompress the video object layers and combine them to reconstruct the video sequence. In addition, if the watermark was encoded into the compressed video object layers by modulating DCT coefficients of intra or inter-frame macroblocks. The watermark can be extracted from the DCT coefficients before the video objects are fully decompressed and combined.

The protected manifest file 665 can be a manifest file including a plurality of addresses (e.g., URLs) each indicating a media file (e.g., video) segment. The media file segments are associated with two or more watermarks (e.g., two or more watermarks can be embedded in media file segments). Each of the plurality of addresses is encrypted. The media device 650 uses the protected manifest file 665 to download each of the referenced media segments (or segment files) which make up the media stream.

Figure 7A:
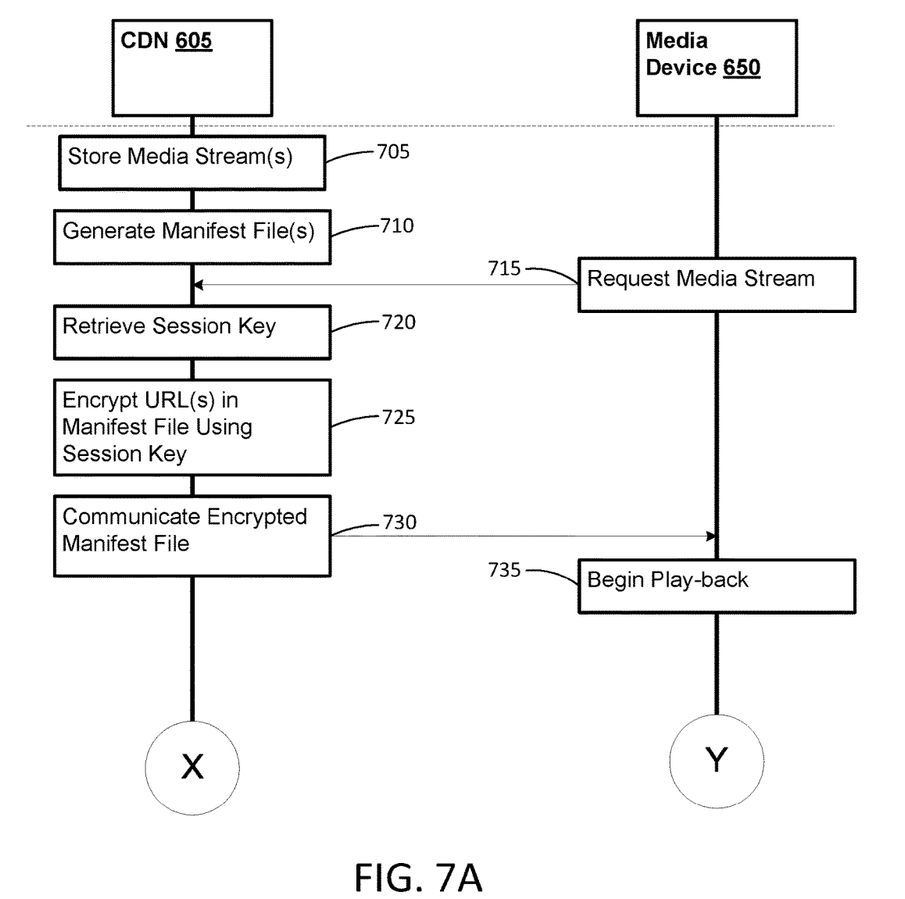
FIGS. 7A and 7B illustrate a signal flow diagram for the streaming media system shown in FIG. 6 according to at least one example embodiment.

FIGS. 7A and 7B illustrate a signal flow diagram for the streaming media system shown in FIG. 6 according to at least one example embodiment. As shown in FIG. 7A flow starts with storing (block 705) media streams (e.g., as media file segments in memory 610). The media streams can be movies, live or previously recorded events (e.g., sporting events), television shows, and/or the like. A manifest file is generated (block 710) by CDN 605. As discussed above, each media stream can have a different watermark. The manifest file can include addresses from two or more media streams (e.g., of the same movie) selected and ordered based on a repeating watermark sequence. (e.g., repeating watermark sequence 315).

The media device requests (block 715) a media stream (e.g., requests a manifest file representing the media stream). The CDN 605 then retrieves a session key (block 720). The session key can be associated with a user(s) of the media device 650 and/or the type (e.g., mobile device, set top box, and/or the like) of media device 605. The CDN 605 encrypts each address (e.g., URL) in the manifest file using the session key (block 725). Then the encrypted or protected manifest file is communicated to the media device 650 (block 730).

Figure 7B:
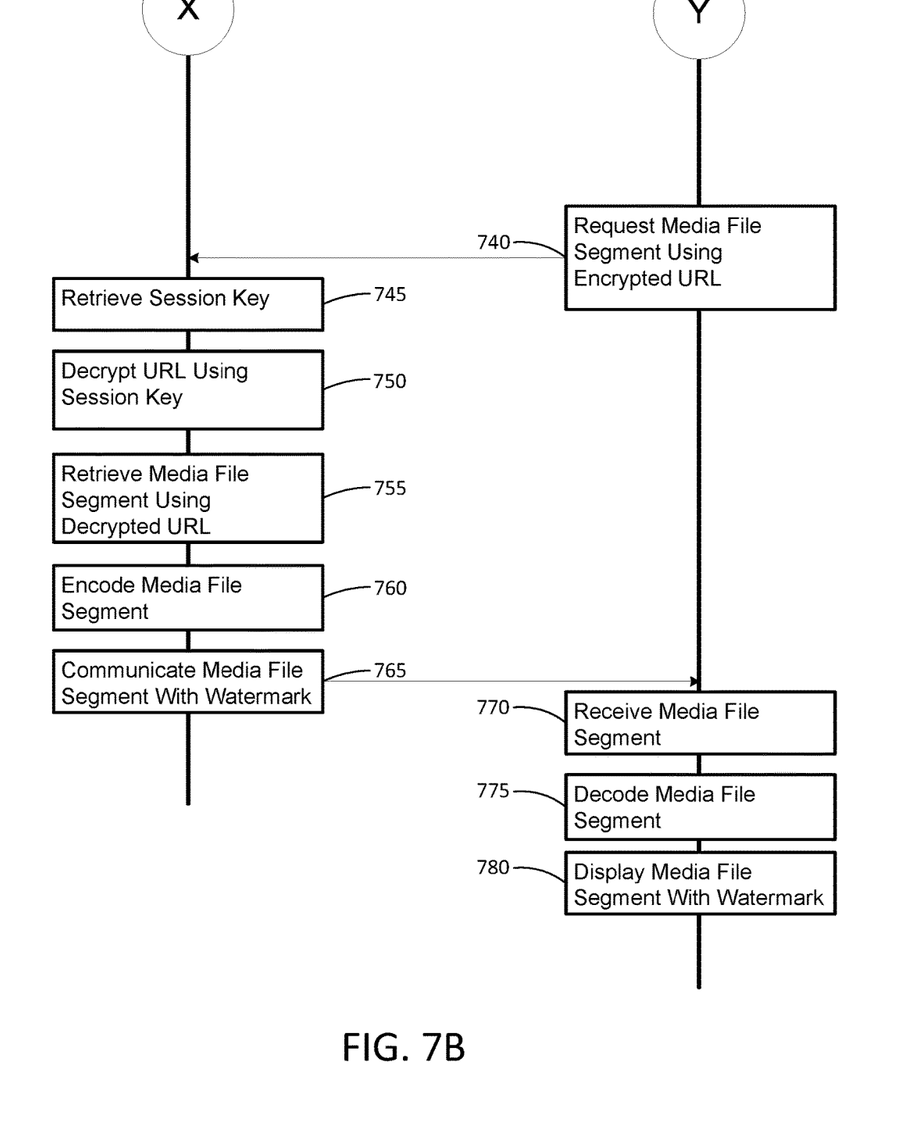

Then the media device 650 begins play-back of the media file (block 735) causing the media file segments to be requested (e.g., sequentially) by the media device 650 from the CDN 605 using the encrypted addresses (URLs) read from the encrypted or protected manifest file (block 740, FIG. 7B). The CDN 605 then retrieves a session key (block 745), decrypts the encrypted address (URL) using the session key (block 750) and retrieves the media file using the decrypted address (URL) (block 755). The CDN 605 then encodes the media file segment (block 760) and communicates (block 765) the encoded media file segment to the media device 650.

The media device 650 receives the encoded media file segment (block 770) and decodes the media file segment (block 775). Finally, the media device displays the media file segment (as part of a streaming video), the media file segment is displayed with a watermark (block 780).

Figure 8:
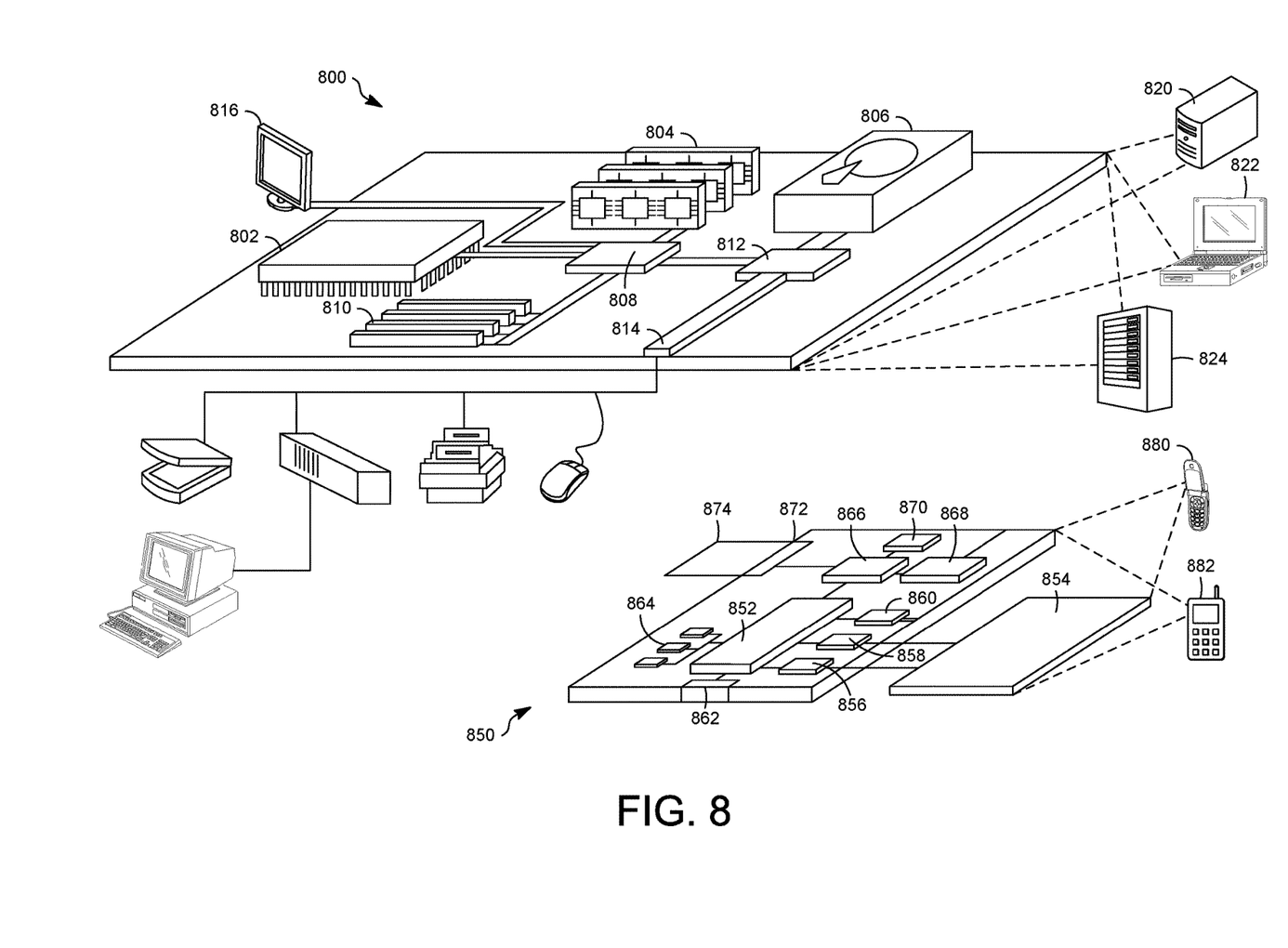
FIG. 8 shows an example of a computer device and a mobile computer device according to at least one example embodiment.

FIG. 8 shows an example of a computer device 800 and a mobile computer device 850, which may be used with the techniques described here. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provided in communication with processor 852, to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provided as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, Wi-Fi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method comprising:
   generating a first media file that includes a plurality of first media file segments;
   generating a second media file as a copy of the first media file, the second media file includes a plurality of second media file segments;
   embedding a first watermark with the plurality of first media file segments;
   embedding at least one second watermark with the plurality of second media file segments;
   generating a plurality of addresses, each of the plurality of addresses referencing one of the plurality of first media file segments or one of the plurality of second media file segments;
   generating a manifest file based on a portion of the plurality of first media file segments and a portion of the plurality of second media file segments, the manifest file including the plurality of addresses referencing one of the plurality of first media file segments or one of the plurality of second media file segments; and encrypting each of the plurality of addresses referencing one of the plurality of first media file segments or one of the plurality of second media file segments included in the manifest file.

2. The method of claim 1, further comprising:
receiving an encrypted address referencing one of the plurality of first media file segments or one of the plurality of second media file segments;
decrypting the encrypted address;
selecting one of the plurality of first media file segments or one of the plurality of second media file segments using the decrypted address; and
communicating the one of the plurality of first media file segments or one of the plurality of second media file segments in response to receiving the encrypted address.

3. The method of claim 1, wherein the manifest file is further based on a repeating watermark sequence.

4. The method of claim 1, wherein the address is a Uniform Resource Locator (URL).

5. The method of claim 1, wherein encrypting each of plurality of addresses includes using an Advanced Encryption Standard (AES) with a shared per-session encryption key.

6. The method of claim 1, wherein
encrypting each of plurality of addresses includes using a shared per-session encryption key, and
the shared per-session encryption key is a session key derived from a common shared key, and session-specific data known to services using the key.

7. The method of claim 1, wherein
encrypting each of plurality of addresses includes using a shared per-session encryption key, and
the shared per-session key is encrypted with a common shared key.

8. The method of claim 1, wherein each of plurality of addresses is a URL used to locate and retrieve an associated media file segment from a memory of a Content Delivery Network (CDN).

9. A non-transitory computer-readable storage medium having stored thereon computer executable program code which, when executed on a computer system, causes the computer system to perform steps comprising:
generating, by a processor of the computer system, a first media file that includes a plurality of first media file segments;
generating, by the processor, a second media file as a copy of the first media file, the second media file includes a plurality of second media file segments;
embedding, by the processor, a first watermark with the plurality of first media file segments;
embedding, by the processor, at least one second watermark with the plurality of second media file segments;
generating, by the processor, a plurality of addresses, each of the plurality of addresses referencing one of the plurality of first media file segments or one of the plurality of second media file segments;
generating, by the processor, a manifest file based on a portion of the plurality of first media file segments and a portion of the plurality of second media file segments, the manifest file including the plurality of addresses referencing one of the plurality of first media file segments or one of the plurality of second media file segments; and
encrypting, by the processor, each of the plurality of addresses referencing one of the plurality of first media file segments or one of the plurality of second media file segments included in the manifest file.

10. The non-transitory computer-readable storage medium of claim 9, the steps further comprising:
receiving an encrypted address referencing one of the plurality of first media file segments or one of the plurality of second media file segments;
decrypting the encrypted address;
selecting one of the plurality of first media file segments or one of the plurality of second media file segments using the decrypted address; and
communicating the one of the plurality of first media file segments or one of the plurality of second media file segments in response to receiving the encrypted address.

11. The non-transitory computer-readable storage medium of claim 9, wherein the manifest file is further based on a repeating watermark sequence.

12. The non-transitory computer-readable storage medium of claim 9, wherein the address is a Uniform Resource Locator (URL).

13. The non-transitory computer-readable storage medium of claim 9, wherein encrypting each of plurality of addresses includes using an Advanced Encryption Standard (AES) with a shared per-session encryption key.

14. The non-transitory computer-readable storage medium of claim 9, wherein
encrypting each of plurality of addresses includes using a shared per-session encryption key, and
the shared per-session encryption key is a session key derived from a common shared key, and session-specific data known to services using the key.

15. The non-transitory computer-readable storage medium of claim 9, wherein
encrypting each of plurality of addresses includes using a shared per-session encryption key, and
the shared per-session key is encrypted with a common shared key.

16. The non-transitory computer-readable storage medium of claim 9, wherein each of plurality of addresses is a URL used to locate and retrieve an associated media file segment from a memory of a Content Delivery Network (CDN).

17. A Content Delivery Network (CDN), comprising:
a memory configured to store:
a first media file that includes a plurality of first media file segments, a second media file as a copy of the first media file, the second media file includes a plurality of second media file segments, and
a manifest file; and
a processor configured to:
embed a first watermark with the plurality of first media file segments,
embed at least one second watermark with the plurality of second media file segments,
generate a plurality of addresses, each of the plurality of addresses referencing one of the plurality of first media file segments or one of the plurality of second media file segments,
generate the manifest file based on a portion of the plurality of first media file segments and a portion of the plurality of second media file segments, the manifest file including the plurality of addresses referencing one of the plurality of first media file segments or one of the plurality of second media file segments, encrypt each of the plurality of addresses referencing one of the plurality of first media file segments or one of the plurality of second media file segments included in the manifest file, receive an encrypted address referencing one of the plurality of first media file segments or one of the plurality of second media file segments, decrypt the encrypted address, select one of the plurality of first media file segments or one of the plurality of second media file segments using the decrypted address, and communicate the one of the plurality of first media file segments or one of the plurality of second media file segments in response to receiving the encrypted address.

18. The CDN of claim 17, wherein encrypting each of plurality of addresses includes using an Advanced Encryption Standard (AES) with a shared per-session encryption key.

19. The CDN of claim 17, wherein encrypting each of plurality of addresses includes using a shared per-session encryption key, and the shared per-session encryption key is a session key derived from a common shared key, and session-specific data known to services using the key.

20. The CDN of claim 17, wherein encrypting each of plurality of addresses includes using a shared per-session encryption key, and the shared per-session key is encrypted with a common shared key.

* * * * *